(12) United States Patent
Ehlinger et al.

(10) Patent No.: US 8,081,750 B1
(45) Date of Patent: Dec. 20, 2011

(54) METHOD FOR REMOTE POPULATION OF SPEED DIAL INFORMATION

(75) Inventors: James Ehlinger, Colts Neck, NJ (US); Christopher P. Gilboy, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1507 days.

(21) Appl. No.: 11/297,642

(22) Filed: Dec. 9, 2005

(51) Int. Cl.
*H04M 1/00* (2006.01)
*H04M 3/00* (2006.01)
(52) U.S. Cl. .................................. 379/355.02
(58) Field of Classification Search ............. 379/355.02
See application file for complete search history.

(56) References Cited

U.S. PATENT DOCUMENTS

| | | | |
|---|---|---|---|
| 5,956,652 A * | 9/1999 | Eriksson ..................... 455/555 |
| 6,424,711 B1 | 7/2002 | Bayless et al. |
| 6,526,042 B1 | 2/2003 | Pinard et al. |
| 7,218,728 B1 * | 5/2007 | Nagasawa et al. ....... 379/387.01 |
| 2002/0173300 A1 * | 11/2002 | Shtivelman et al. .......... 455/418 |
| 2003/0140091 A1 * | 7/2003 | Himmel et al. ............... 709/203 |

* cited by examiner

*Primary Examiner* — Alexander Jamal
(74) *Attorney, Agent, or Firm* — Greenblum & Bernstein, P.L.C.

(57) ABSTRACT

A method that permits a user to select a telephone number contained in an e-mail, web page, or other text page displayed on the screen of a computing device and store that telephone number in memory for later use. Other information may also be selected and stored, such as the name or e-mail address of a person associated with the telephone number.

27 Claims, 8 Drawing Sheets

| Reply | Reply to All | Forward | X |

From: Jim
To: Chris
Cc: Robert
Subject: Call me

Chris -
Call me ASAP to discuss.
I am at 703-555-3456  802

Thanks,
Jim 801, 803, 804

Fig. 8

METHOD FOR REMOTE POPULATION OF SPEED DIAL INFORMATION

FIELD OF THE INVENTION

The present invention relates generally to the field of telecommunications. Specifically, the present invention relates to a method and apparatus for saving telephone numbers or other information to a telephone memory for later use.

BACKGROUND OF THE INVENTION

In today's work environment, telephone and e-mail are two popular methods to communicate, and have become essential to the functioning of a modern business. Increasingly, the line between the telephone and e-mail systems is becoming blurred. In many businesses, the telephones and computers are linked to a common network. One result of this common linking is that voice mail messages may be retrieved on the computer via e-mail and e-mail messages may be retrieved via telephone. In addition, the rapid rise of wireless technology has permitted the development of hybrid devices such as mobile telephones that can receive e-mail and handheld e-mail devices that can function as a telephone. Notable among these are the currently popular the Treo™ Smartphone, which can also be used to send and receive e-mails, and the Blackberry® wireless e-mail device, which may also contain telephone capability. Some of these devices also are web-enabled, permitting the user to access web pages or other information over the Internet or another wireless network.

However, despite their residence within the same network or even the same device, the two communication methods are not very well linked to each other. For example, a person may receive an e-mail with a request from the sender to give them a call at a designated phone number. Although some existing systems, such as the Treo® Smartphone, have the capability to automatically dial the designated number, there is no way to automatically save the designed number into a telephone's memory for later "speed-dial" redialing, but instead the number must be manually entered, which both takes time and carries the risk of improper entry.

Prior art systems that relate to the connection between the computer and the telephone fail to address this problem. For example, U.S. Pat. No. 6,424,711 to Bayless et al. discloses a system that permits the automatic display of information regarding a caller, including telephone number and the local time and location of the calling party. However, the system disclosed in Bayless et al. merely provides a system and method for display of the information regarding the caller; it does not permit the called party to automatically retrieve this information for storage in the called party's telephone memory or otherwise.

U.S. Pat. No. 6,526,042 to Pinard et al. also fails to solve this problem. Pinard discloses a "click to call" method such as is used in the Treo™ Smartphone, in which a call recipient can click on a hyperlink in an e-mail message to initiate a return telephone to the sending party. By clicking on the hyperlink, the call recipient launches a web browser to access a web page which then returns an applet that initiates a return call to the sending party. However, the sending party's telephone number or other caller ID information is not stored in memory for future use but is only retrieved each time the "call me" hyperlink is clicked. The return caller's caller ID information also is not provided to the sending party, since the return call is not made directly from the caller but via intermediary call control software. In addition, the method of Pinard requires a web browser, and cannot be used by the users of Blackberries® or Treos™ who only retrieve e-mails on the phones but do not have full web browser capability.

Thus, there is a need for a method and apparatus which permits a user to quickly and easily select a telephone number contained in an e-mail, web page, or other text displayed on a screen and store that telephone number in telephone memory for later use.

BRIEF SUMMARY OF THE INVENTION

The present invention provides a system and method that permits a user to select a telephone number contained in an e-mail, web page, or other text page displayed on the screen of a computing device and store that telephone number in memory for later use. In addition, in accordance with the present invention, other information may also be selected and stored, such as the name or e-mail address of a person associated with the telephone number.

In one embodiment of the present invention, a computing device and a telephone are located together in an office environment. The telephone is connected to a Private Branch Exchange (PBX). The computing device is connected to a Wide Area Network (WAN), which in turn is connected both to the Internet and to the PBX. The PBX is in turn connected to the Public Switched Telephone Network (PSTN) so that calls can be generated and received.

In a second embodiment of the present invention, the computing device and telephone are both connected to a Local Area Network (LAN), which may be a wired or wireless network. In this embodiment, the telephone and the computing device communicate directly through the LAN, with the telephone making calls over the LAN, using, for example, Voice Over Internet Protocol (VoIP) known in the art.

In another embodiment of the present invention, the computing device and the telephone are again part of a LAN. In this embodiment, the telephone and the computing device connect to the network via a short-range wireless protocol such as Bluetooth® or Zigbee™. The telephone connects to the PSTN via a wireless telephone network such as a cellular network.

In a further embodiment of the invention, the computing device and the telephone handset reside in the same piece of equipment. In this embodiment, this single device communicates with other computing devices or with telephone handsets over a wireless network.

In each embodiment, an applet runs on the computing device. Upon activation by the user, the applet creates a datagram containing the selected telephone number and the desired memory location and sends the datagram to the telephone handset to complete storage of the selected number in the speed dial memory of the user's telephone handset.

In another embodiment of the invention, the user may also select other information such as a name associated with the telephone number, which then may also be stored as part of the datagram and sent to the telephone handset for storage in memory.

BRIEF DESCRIPTION OF THE DRAWINGS

FIG. 8 depicts an alternative user interface for the present invention.

DETAILED DESCRIPTION OF THE INVENTION

In the following description of the various embodiments, reference is made to the accompanying drawings, which form a part of the description of the invention, and in which various embodiments of the invention are shown by way of illustration. It is to be understood that these embodiments are not exclusive, and that other embodiments may be utilized and structural and functional modifications may be made without departing from the scope and spirit of the present invention.

Figure 1:
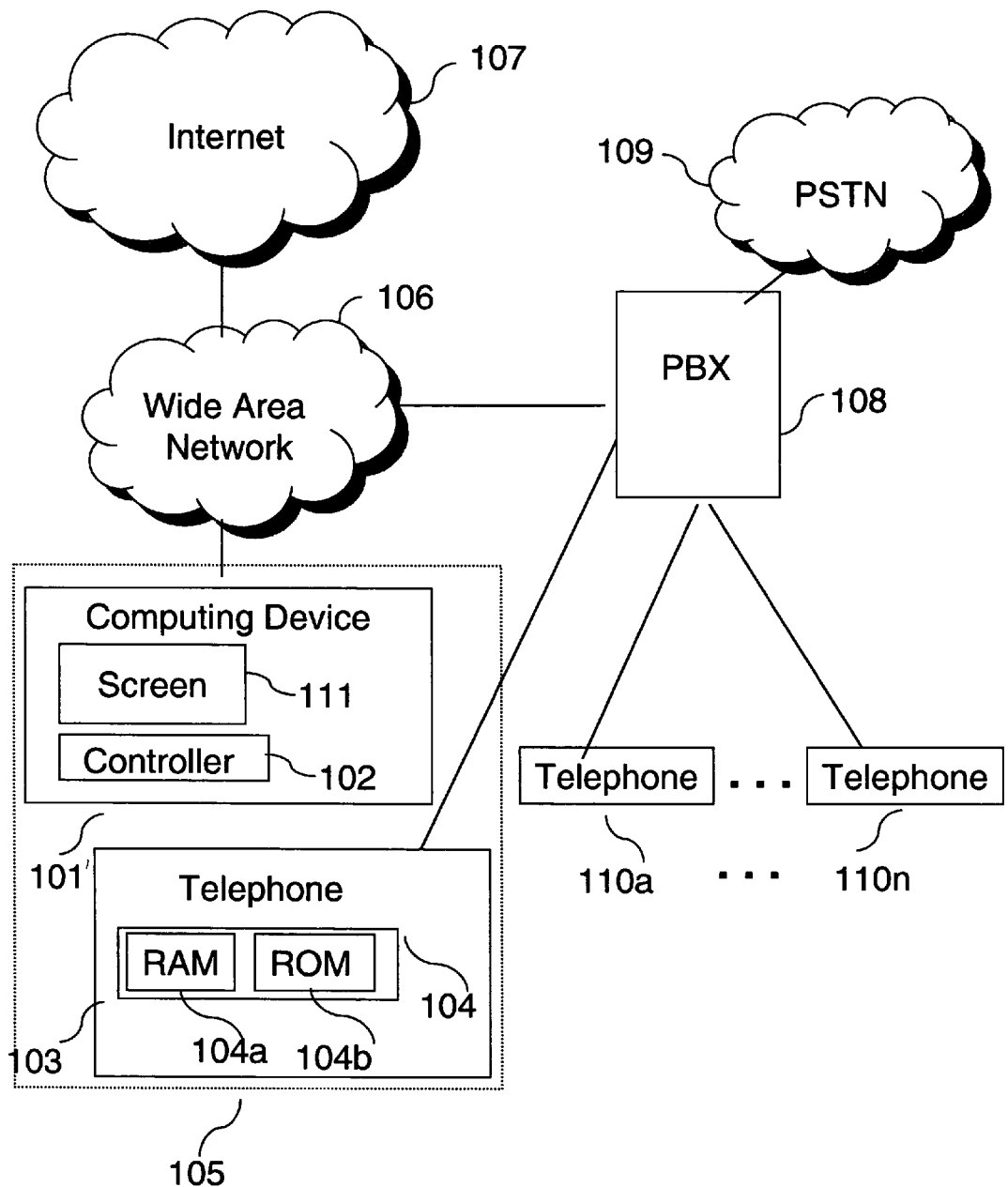
FIG. 1 is a block diagram of one embodiment of the present invention

FIG. 1 depicts a first embodiment of the present invention. This embodiment may be typical of an office environment containing both computing devices and telephone handsets. In this embodiment, a computing device 101 containing a controller 102 and screen 111 and a telephone handset 103 containing a memory 104 comprising Random Access Memory (RAM) 104*a* and Read-Only Memory (ROM) 104*b* (such as a Programmable Read-Only Memory (PROM), Erasable Programmable Read-Only Memory (EPROM), Electrically Erasable Programmable Read-Only Memory (EEPROM) or the like) are physically located together, for example, on a user's desktop work area 105. The computing device 101 may be any kind of computing device used today, such as a personal desktop computer or a laptop computer, or may be a more portable computing device such as a so-called "pocket PC," Palm Pilot® or Blackberry®. The computing device is connected to a network such as a Wide Area Network (WAN) 106, known in the art, which in turn is connected to the Internet 107. The connection to the WAN enables the user of the computing device to quickly and easily send information to and receive information from other computing devices on the network, either by means of web pages or e-mail accessed via the Internet, or by means of so-called "intranet" pages or internal e-mail.

In this first embodiment of the present invention, the telephone handset 103 is connected to a Private Branch Exchange (PBX) 108 known in the art, typical in a medium or large-scale business environment. Telephone calls may be made to other telephone handsets connected to the PBX in a manner known in the art by, for example, dialing a 4- or 5-digit extension number. The PBX 108 also is connected to a Public Switched Telephone Network (PSTN) 109 known in the art, and telephone calls may be made to and received from telephone handsets not connected to the PBX 108 by means of the PSTN 109 in a conventional manner well known in the art. In this embodiment, the computing device 101 also is connected to the PBX 108 by means of the WAN 106. Thus, the computing device, the telephone handset, the PBX, and the PSTN form an integrated network wherein the Internet, e-mail, and the telephone comprise the communications means shared by the users on the network.

Figure 2:
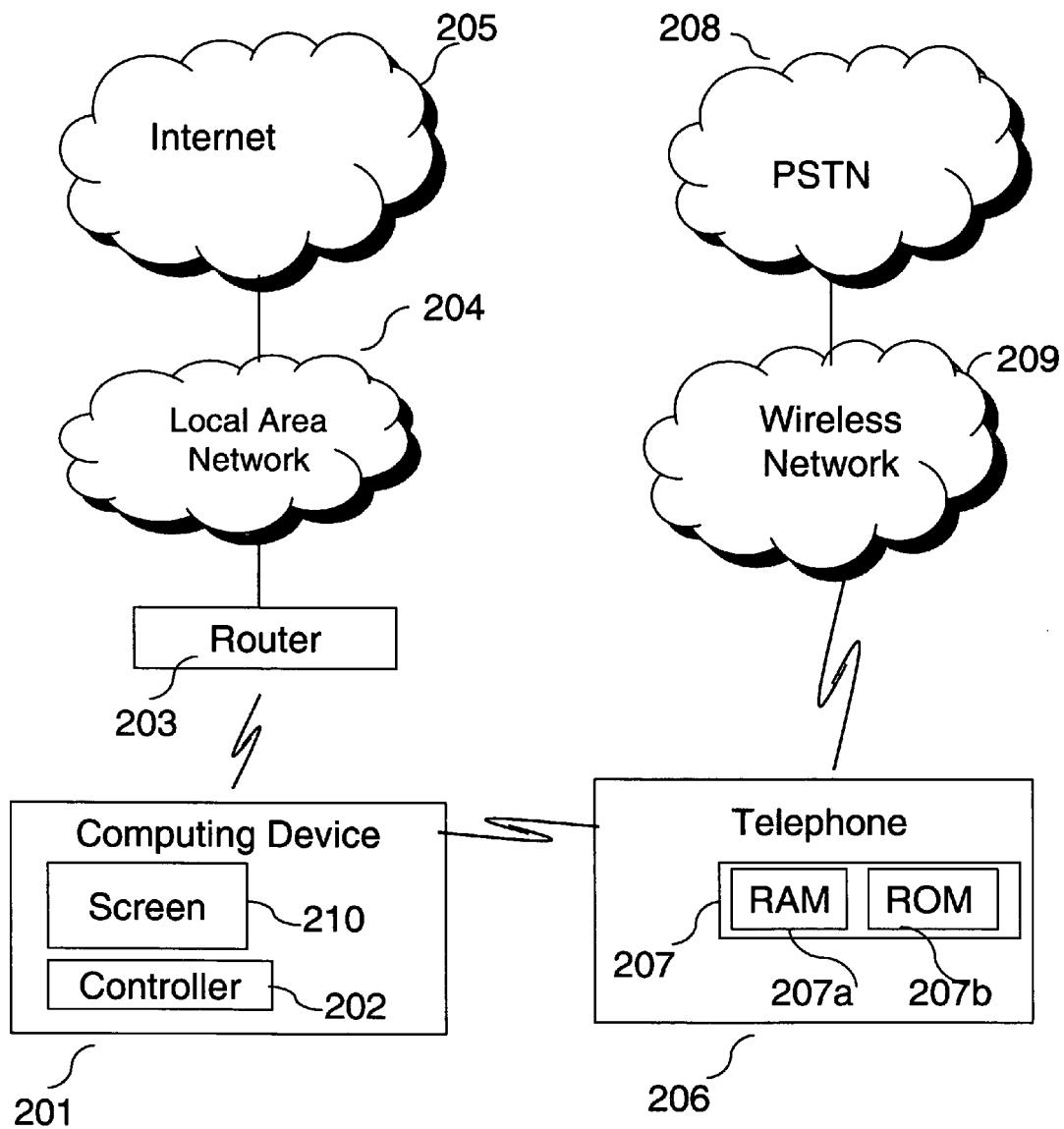
FIG. 2 is a block diagram of a second network embodiment of the present invention

FIG. 2 depicts a second embodiment of a network implementation of the present invention. In this embodiment, the computing device 201 containing controller 202 and screen 210 is part of a local area network (LAN) 204 connecting the computing device 201 to other computing devices in the network. In the embodiment shown in FIG. 2, such a LAN may be a wireless network connected via a router 203 using IEEE 802.11 Wi-Fi or IEEE 802.16 Wi-Max technology known in the art, but may alternatively be a wired network connected via an Ethernet network, also known in the art. The wireless or wired LAN is further connected to the Internet 205 by means of conventional broadband connections known in the art. In this embodiment, the telephone handset 206 containing memory 207 comprising RAM 207*a* and ROM 207*b* is a mobile telephone that connects to the PSTN 208 via a wireless telephone network 209, e.g., a cellular telephone or PCS network known in the art. Communications between the computing device 201 and the telephone handset 206 are accomplished by means of a short-range wireless protocol, for example, the Bluetooth® or Zigbee™ protocols known in the art.

Figure 3:
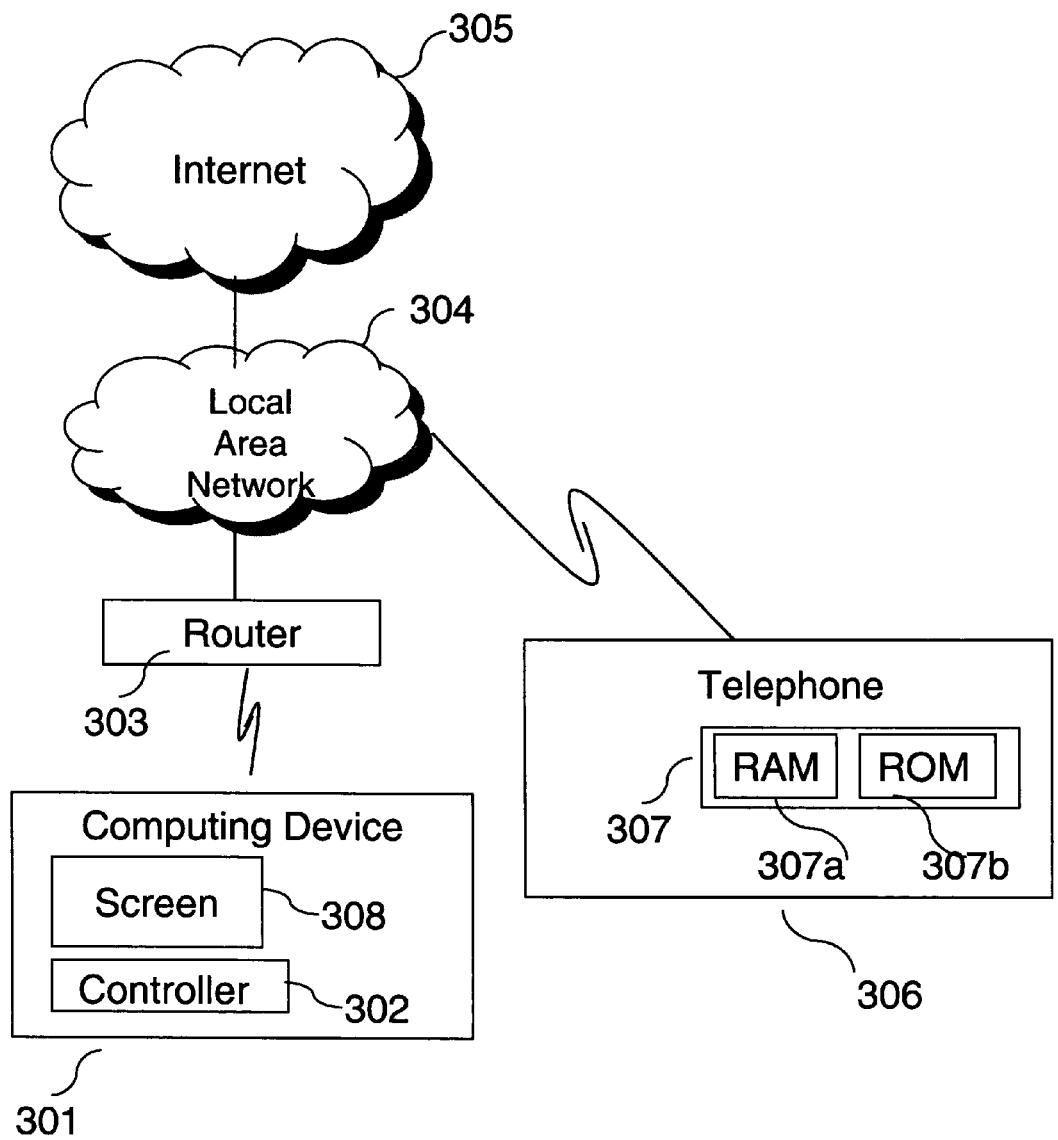
FIG. 3 is a block diagram of a third network embodiment of the present invention.

FIG. 3 shows a further network implementation of the present invention. This embodiment is similar to the embodiment of FIG. 2 in that the computing device 301 with controller 302 and screen 308 is connected to other computing devices and to the Internet 305 by means of a LAN 304 or a WAN using a wireless router 303 or wired connection. In this embodiment, the telephone handset 306 having memory 307 comprising RAM 307*a* and ROM 307*b* is a mobile telephone that is also directly connected to the LAN 304 or the WAN by means of a Voice Over Internet Protocol (VoIP) connection such as IEEE 802.11 Wi-Fi, WiMax, or other means known in the art. In this embodiment, the computing device 301 and the telephone handset 306 communicate through the LAN 304. The telephone handset 306 communicates with other telephone handsets both within and outside the network by means of VoIP wireless communication in a manner known in the art.

Figure 4:
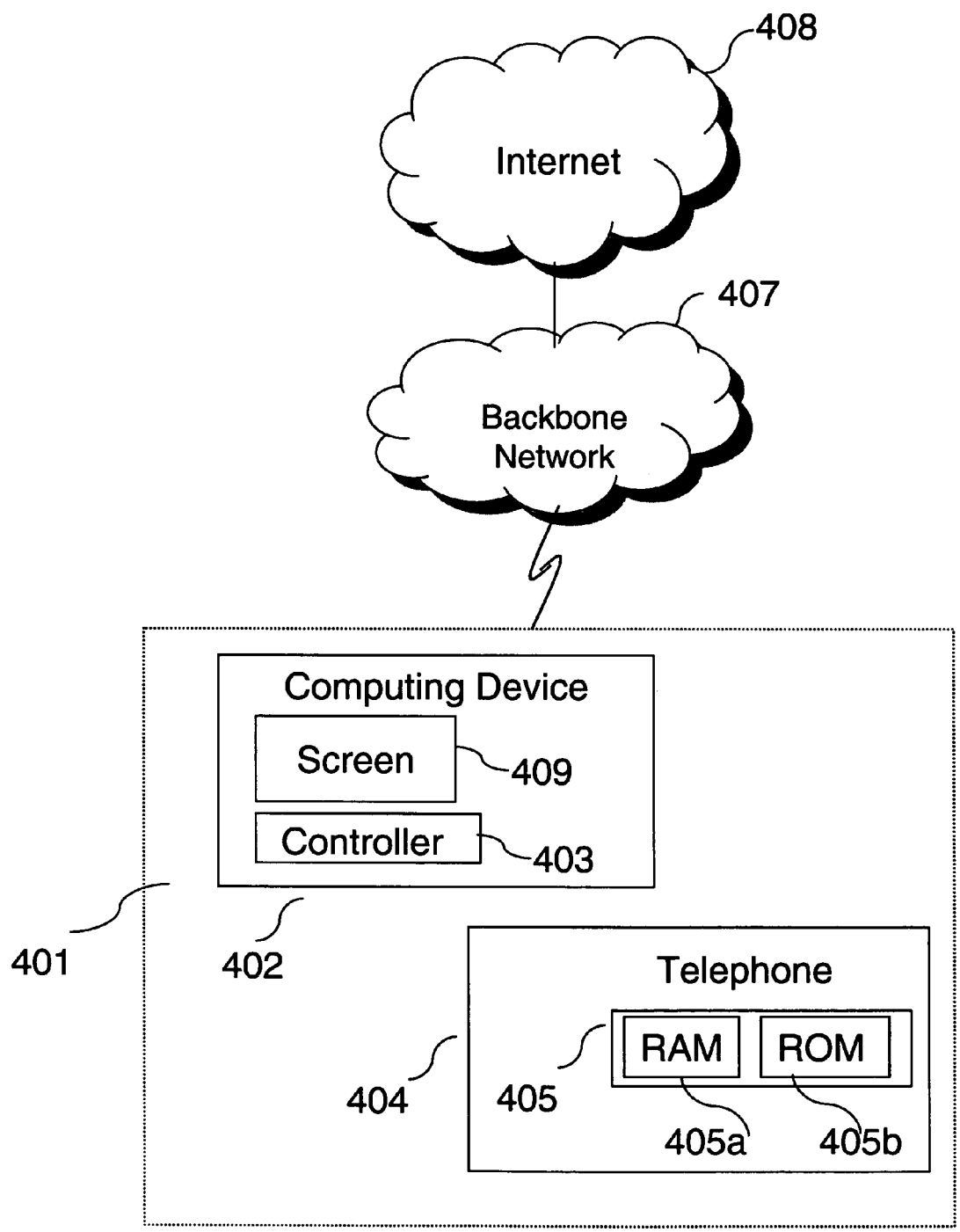
FIG. 4 is a block diagram of a fourth embodiment of the present invention.

FIG. 4 shows a fourth embodiment of the present invention. In this embodiment, the computing device 402 with associated controller 403 and screen 409 and the telephone handset 404 containing memory 405 comprising RAM 405*a* and ROM 405*b* and its associated controller 406 reside in the same piece of equipment 401, for example, in a device such as a Blackberry®, Treo™ Smartphone, or the like. In this embodiment, both the computing device 402 and the telephone handset 404 communicate with other devices over a wireless backbone network 407 such as an IEEE 802.11 Wi-Fi network or a network using IEEE 802.16 Wi-Max technology, both known in the art, that is also connected to the Internet 408.

The inventive methods disclosed herein may be embodied as computer-readable instructions stored on a computer-readable medium such as a CD-ROM, DVD ROM, removable storage device, hard disk, system memory, embedded memory, flash memory or other data storage medium. The computer-readable medium stores computer-executable components, or software modules. More or fewer software modules may alternatively be used. Each component or module may be an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings of the present invention.

Figure 5:
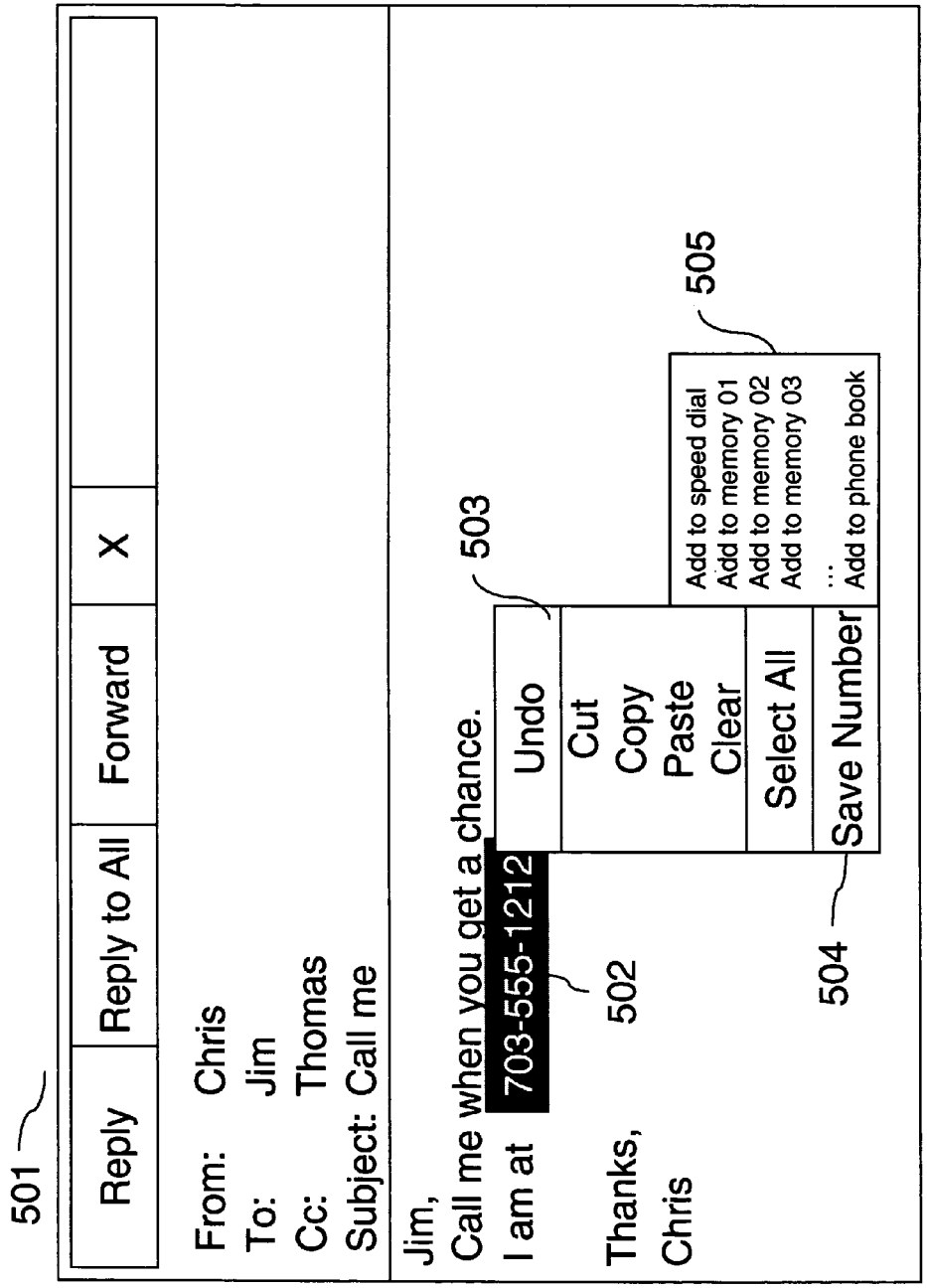
FIG. 5 is a screen shot of sample user interface in accordance with the present invention.

Using the embodiment of FIG. 1 as exemplary, the present invention provides a method and an apparatus by which a user who views a telephone number or other information on a screen in a computing device can quickly and easily save that telephone number in memory in the telephone handset, for example, in the speed dial memory of the telephone handset. As shown in FIG. 5, a user on a network may receive an e-mail 501 displayed on screen 111 of computing device 101, wherein the sender requests that the recipient of the e-mail call him at a designated telephone number 502 shown in the e-mail. In accordance with the present invention, the recipient of the e-mail can select the indicated telephone number 502 by means of a selection device such as a conventional "point-and-click" mouse or other selection device which permits the identification and selection of all or a portion of text shown on a computer screen.

Once the desired text 502 is selected, the recipient can then activate a small application or executable module, commonly known in the art as an "applet," residing on the computing device to save the selected text to memory. This applet may be activated by any means for activating an applet known in the art. One common way to initiate such an applet is by "right-clicking" on the selected text. Alternatively, the applet may be activated by clicking a button a toolbar, as shown in FIG. 8, or by selecting from a menu of options otherwise made available to the user.

When the selected text is "right-clicked," a menu appears on the screen listing one or more actions which may be taken with respect to the selected text. In accordance with the present invention, as shown in FIG. 5, one of the options 504 is "save number." If that option 504 is selected, for example, by using the mouse to click on that menu choice, a further sub-menu 505 appears, giving the user options regarding further action to be taken. As shown in FIG. 5, one option may be to save the selected telephone number in a memory location in which the text may be stored, such as RAM 104*a* in the telephone 103. Alternatively, as shown in FIG. 5, another option 505 for storage of the selected text may be "add to speed dial", which may be the handset's default speed dial location such as a "redial" button or associated keypad shortcut such as "##" commonly used in telephones connected to a PBX. Other options for storage may be "add to memory 01", which would be the handset's first memory location, "add to memory 02", which would be the handset's second memory location, or "add to phone book", which would be the handset's scrollable listing of stored telephone numbers. Alternatively, the user could simply select "add to last number dialed", which would permit the user to use a convention "redial" feature well known in the art to dial the selected telephone number.

In an alternative embodiment of the present invention, rather than simply save the selected telephone number for future use, after the selected telephone number is saved to memory as set forth in more detail below, the telephone handset may automatically initiate a telephone call to the saved number. In this way, the recipient of the email can automatically make a telephone cal to the highlighted number, with the number also being stored in memory for future use.

Figure 6:
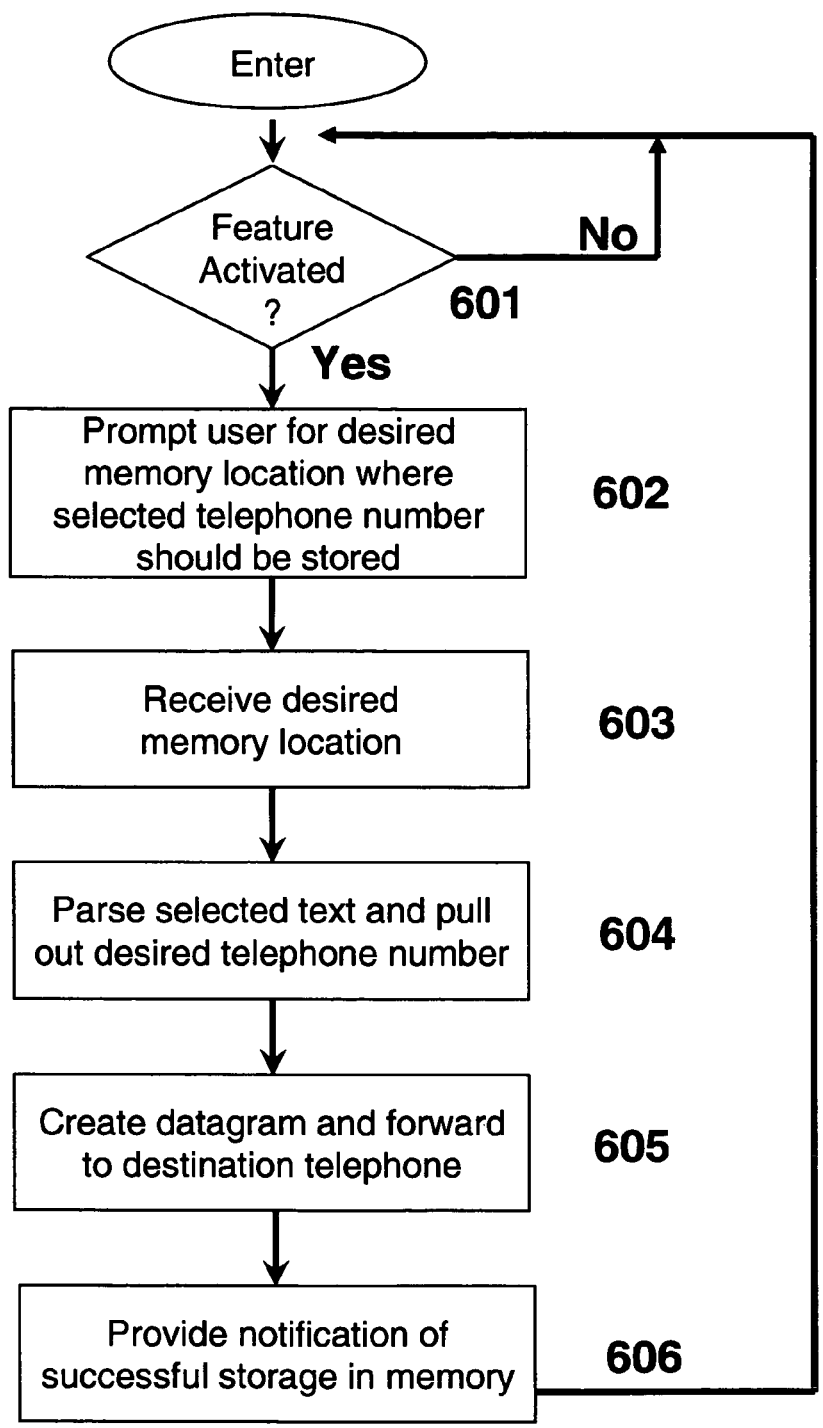
FIG. 6 is a flow chart illustrating the logic flow in accordance with the present invention.

FIG. 6 shows the logic flow used by the computing device to implement the present invention. As shown in step 601, the applet remains dormant until the user activates it, for example, by highlighting and right-clicking on the desired telephone number. As shown in step 602, once activated, the applet prompts the user for the desired location for the highlighted telephone number to be stored. As discussed above with respect to FIG. 5, this prompt may occur by means of a menu 503 or sub-menu 504 that appears on the screen, giving the user options regarding actions to be taken with respect to the highlighted telephone number.

In step 603, the controller 102 in the computing device 101 receives the user's selection of a location for storage of the highlighted telephone number. As shown in FIG. 5, this may be a speed dial location, a specified memory location, or more generally simply in the user's "phone book". Once the selection of storage location is received, in step 604 the controller 102 parses the highlighted telephone number for further processing. This step may involve removing extraneous characters often used in conventional telephone number displays, such as "(",")", or "-". For example, if a user highlights a telephone number displayed as "(800) 555-1212," the controller will parse this number to remove the extraneous characters and save it as "8005551212". It is to be noted that in an additional embodiment of the present invention, a user may also be able to highlight and store text to be associated with the telephone number. In such an embodiment, valid letter characters (such as A-Z and a-z) can be parsed and stored as an alpha text identifier associated with the telephone number. For example, text displayed as "Jenny (800) 555-1212" will be parsed by the controller and saved as two separate parts, one containing the alpha characters "Jenny" and another containing the associated telephone number "8005551212."

In step 605, the controller 102 creates a datagram to be sent to the telephone handset. The datagram contains the necessary instructions and information to permit the storage of the selected telephone number and any associated alpha information into the telephone handset's memory.

The datagram itself would be wrapped within the protocol used for communications between the telephone handset and the computing device in a manner known in the art. For example, in the embodiment shown in FIG. 1, the datagram is contained within a IP message generated by controller 102 of computing device 101, and would be forwarded from the computing device 101 to telephone handset 103 by means of the WAN 106 and the PBX 108. In the embodiment of FIG. 2, the datagram is generated by controller 202 of computing device 201 and is transmitted to the telephone handset 206 using a short-range wireless communication protocol such as Bluetooth® or Zigbee™, both well known in the art. In the embodiment of FIG. 3, the datagram is generated by controller 302 of computing device 301, is wrapped within an IP message in a manner known in the art, and is forwarded to the telephone handset 306 via the LAN/WAN. In the embodiment of FIG. 4, the datagram is generated by the controller 403 associated with the computer aspect of the device 401 and remains internal to the device and is implemented as, for example, a parameter in a software function call made by the controller 406 of the telephone handset aspect of the device.

After the datagram is generated by the computing device and sent to the telephone handset via the appropriate protocol, the selected telephone number is processed in accordance with the instructions provided in the datagram and is stored in memory for future use. As shown in FIG. 6, after the telephone number is stored, there may optionally be a step 606 to provide feedback to the user by means of an audio or a visual notification to inform the user that the selected telephone number and/or text identifier has been successfully stored in the selected memory location.

Figure 7:
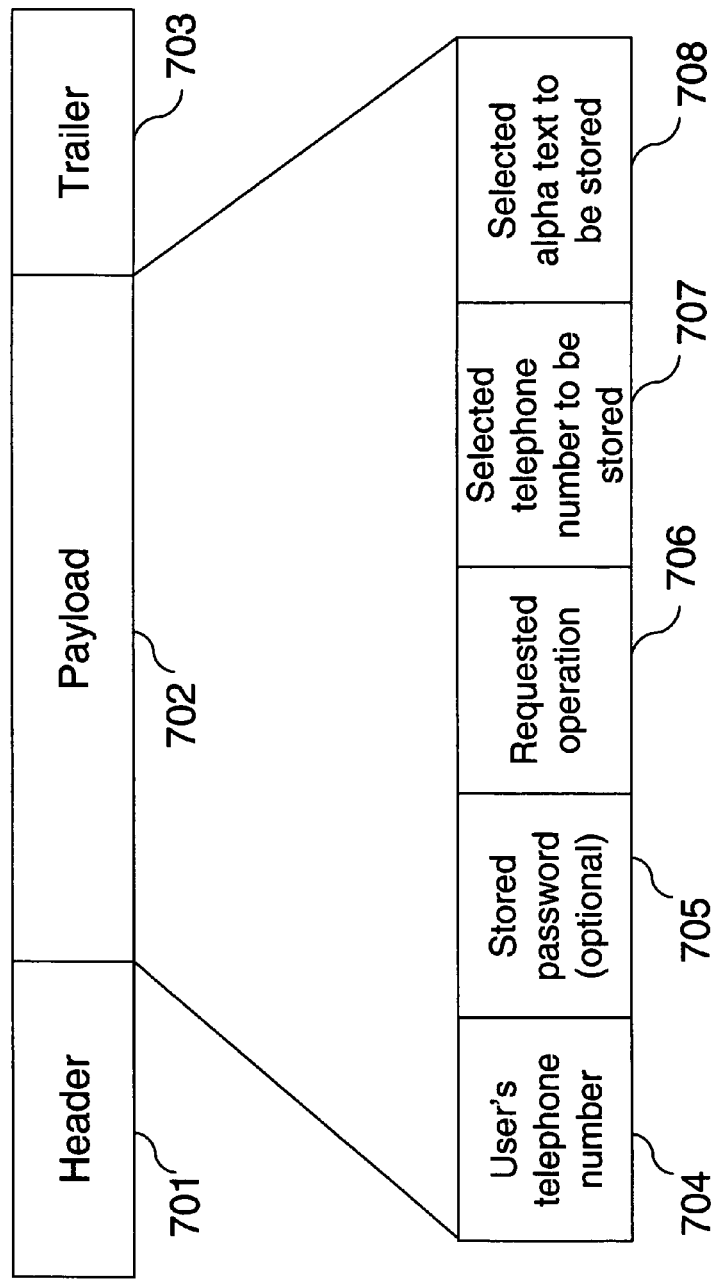
FIG. 7 is a block diagram of a datagram created by the applet in accordance with the present invention.

FIG. 7 shows an exemplary datagram generated in accordance with the present invention. The datagram consists of header 701, payload 702, and trailer 703. As indicated above, the header and trailer of this datagram would be formatted in accordance with the specific protocol being used for communication between the computing device and the telephone headset.

The payload 702 of the datagram contains the information to be used to store the selected telephone number and optional associated text identifier to the selected memory location within the telephone handset. The first part 704 of the datagram payload contains the user's telephone number, i.e., the telephone number associated with the requesting telephone handset. This acts as an address of the desired destination for the saved telephone number. For example, in the network embodiment of FIG. 1, the destination telephone number would instruct the PBX 108 as to which telephone's speed dial to update with the saved telephone number information.

The next part 705 of the payload is a password that has been pre-selected by the user and must be entered before the storage of the telephone number in memory can proceed. This part of the payload is optional, but may be desirable by many users for security purposes.

The next part 706 of the datagram's payload consists of the requested operation to be performed at the telephone handset. The requested operation may be represented by an alphanumeric code corresponding to a specific action to be taken. For example, the requested operation may be to add the selected telephone number to the telephone handset's general speed dial memory or add the selected telephone number to a specific speed dial location such as speed dial #1 or speed dial #2, etc. The requested operation may be simply to place the selected telephone number in the telephone handset's phonebook of stored telephone numbers. Alternatively, the requested operation may be to place the selected number in the telephone handset's registry of dialed numbers so that it may simply be "redialed" by the user. Each of these actions may be represented by a different alphanumeric code contained within part 706 of the datagram's payload.

Part 707 of the datagram's payload is the selected telephone number to be stored in accordance with the instructions in part 706 of the payload. Optionally, if an alpha text identifier is selected, part 708 of the datagram's payload is the selected alpha text to be stored in accordance with additional instructions in part 706 of the payload relating to storage of alpha text.

Once the datagram shown in FIG. 7 is received and processed by the destination telephone handset in accordance with the instructions 706 in the payload and the communication protocol used between the computing device and the telephone handset, the selected telephone number is stored in the selected memory and is available to the user for speed dial, dialing out of the phonebook, or redial.

In an alternative embodiment of the user interface of the present invention shown in FIG. 8, the applet used by the present invention to store a highlighted telephone number 802 contained within e-mail 801 may be activated by means of a button 803 on a toolbar 804 in a conventional graphic user interface known in the art. In this embodiment, the user may have preselected the actions to be taken with respect to the highlighted telephone number; for example, the user may have preselected that the telephone number is always to be stored in the telephone handset's phonebook, is always to be stored in the next available speed dial location, or is always to be stored in as a "redial" telephone number. These preferences may be selected and stored in by means of an options menu of the storage applet in a manner well known in the art. In such a case, the user simply highlights the desired telephone number and clicks on the toolbar button; the datagram is created and sent to the destination telephone number as soon as the button is clicked without need for any further input from the user. Alternatively, the act of clicking on the toolbar button may simply activate the applet, and the user proceeds to select the desired action and storage location as discussed above with respect to FIG. 5, with the datagram being generated, sent, and acted upon in the usual manner.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. For example, the present invention may be used to select and store any text displayed on a screen, whether in an email, a web page, or otherwise. Thus, the spirit and scope of the invention should be construed broadly as set forth in the appended embodiments.

We claim:

1. A method for remotely saving communications addresses, comprising:
    displaying text in a received addressed data communication on a screen of a first user device to which the addressed data communication was addressed from a sender;
    receiving, at the first user device, a selection of the text in the received addressed data communication representing a first communications address different from an address from which the addressed data communication was sent or at which the addressed data communication is received;
    visually prompting at the first user device for a memory location of a second user device at a second communications address to which the first communications address will be forwarded, and forwarding the first communications address from the first user device to the second user device in response to receiving the memory location of the second user device, and
    sending an instruction from the first user device to the second user device to save the selected text in the memory location of the second user device,
    wherein the first communications address is stored in the memory location of the second user device.

2. The method of claim 1,
    wherein the received addressed data communication is an email.

3. The method of claim 1,
    wherein the first user device is a computing device connected to a first network and the second user device is a telephone handset connected to a second network.

4. The method of claim 1,
    wherein the second network is a wireless telephone network.

5. The method of claim 1,
    wherein the first user device is a computing device connected to a network and the second user device is a telephone handset connected to the network.

6. The method of claim 1,
    wherein the first user device is a computing device and the second user device is a telephone handset and the first user device and the second user device further is housed within a single device.

7. The method of claim 1,
    wherein the first communications address is a telephone number.

8. The method of claim 7,
    wherein the memory location is a speed dial location in the second user device.

9. The method of claim 7,
    wherein the memory location is a registry of previously dialed telephone numbers in the second user device.

10. The method of claim 1, further comprising:
    selecting a memory location from a plurality of memory locations in the second user device.

11. A method for remotely saving communications addresses, comprising:

displaying text in a received addressed data communication on a screen of a first user device to which the addressed data communication was addressed from a sender;

receiving, at the first user device, a selection of first text in the received addressed data communication representing a first communication address different from an address from which the addressed data communication was sent or at which the addressed data communication is received;

receiving, at the first user device, a selection of second text in the received addressed data communication;

visually prompting at the first user device for a first memory location and a second memory location of a second user device to which the first communications address and the second text will be forwarded, and forwarding the first communications address and the second text from the first user device to the second user device in response to receiving the first memory location and the second memory location of the second user device, and sending an instruction from the first user device to the second user device to save the first communications address in the first memory location and the second text in the second memory location, wherein the first communications address is stored in the first memory location; and wherein the second text is stored in the second memory location.

12. The method of claim 1,
wherein the first user device is a computing device connected to a network and the second user device is a telephone handset connected to a private branch exchange.

13. The method of claim 11,
wherein the first user device is a computing device connected to a first network and the second user device is a telephone handset connected to a second network.

14. The method of claim 13,
wherein the second network is a wireless telephone network.

15. The method of claim 11,
wherein the first user device is a computing device connected to a network and the second user device is a telephone handset connected to the same network.

16. The method of claim 11,
wherein the first user device is a computing device and the second user device is a telephone handset and the first user device and the second user device further is housed within a single device.

17. The method of claim 11,
wherein the first communications address is a telephone number and the received addressed data communication is an email.

18. The method of claim 17,
wherein the second text is an alphanumeric string associated with the telephone number.

19. The method of claim 11,
wherein the first memory location is a speed dial location in the second user device.

20. The method of claim 11,
wherein the first memory location is a registry of previously dialed telephone numbers in the second user device.

21. The method of claim 18,
wherein the second memory location is a registry of alphanumeric information associated with the telephone number.

22. The method of claim 11, further comprising:
selecting the first memory location from a plurality of memory locations in the second user device.

23. A method for remotely saving communications addresses, comprising:

displaying text in a received addressed data communication on a screen of a first user device to which the addressed data communication was addressed from a sender;

receiving, at the first user device, a selection of the text in the received addressed data communication representing a first communications address different from an address from which the addressed data communication was sent or at which the addressed data communication is received;

forwarding the first communications address to a second user device, distinct from and housed separately from the first user device, at a second communications address, and sending an instruction from the first user device to the second user device to initiate a telephone call to the first communications address, wherein the second user device makes the telephone call to the first communications address.

24. The method of claim 23,
wherein the first user device is a computing device connected to a network and the second user device is a telephone handset connected to a private branch exchange.

25. The method of claim 23,
wherein the first user device is a computing device connected to a first network and the second user device is a telephone handset connected to a second network.

26. The method of claim 25,
wherein the second network is a wireless telephone network.

27. The method of claim 23,
wherein the first user device is a computing device connected to a network and the second user device is a telephone handset connected to the same network.

* * * * *